US012104764B2

(12) United States Patent
Boogaard et al.

(10) Patent No.: US 12,104,764 B2
(45) Date of Patent: Oct. 1, 2024

(54) DUAL FUNCTION LIGHTING DEVICE

(71) Applicant: LUMILEDS LLC, San Jose, CA (US)

(72) Inventors: Wim Boogaard, Oostkapelle (NL); Piet Verburg, Goes (NL); Pieter Van Der Wekken, Middleburg (NL)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/925,268

(22) PCT Filed: May 14, 2021

(86) PCT No.: PCT/US2021/032571

§ 371 (c)(1),
(2) Date: Nov. 14, 2022

(87) PCT Pub. No.: WO2021/231939

PCT Pub. Date: Nov. 18, 2021

(65) Prior Publication Data

US 2023/0220972 A1 Jul. 13, 2023

Related U.S. Application Data

(60) Provisional application No. 63/024,891, filed on May 14, 2020.

(30) Foreign Application Priority Data

Jun. 17, 2020 (EP) .................................... 20180559

(51) Int. Cl.
*F21S 45/47* (2018.01)
*F21V 29/71* (2015.01)

(52) U.S. Cl.
CPC ............ *F21S 45/47* (2018.01); *F21V 29/713* (2015.01)

(58) Field of Classification Search
CPC .......... F21S 45/47; F21S 41/147; F21S 41/19; F21S 45/49; F21V 29/713; F21V 29/71
See application file for complete search history.

(56) References Cited

U.S. PATENT DOCUMENTS 7,607,806 B2 * 10/2009 Hayashi .................. F21V 29/81
174/16.3
8,956,018 B2 * 2/2015 Deshpande ............. F21S 8/088
362/249.02
(Continued)

FOREIGN PATENT DOCUMENTS

CN 203322778 U 12/2013
CN 109373205 * 2/2019 ............. F21V 29/71
(Continued)

OTHER PUBLICATIONS

CN 109373205, Zhi-quang Yuan, Feb. 22, 2019, English translation (Year: 2019).*
(Continued)

*Primary Examiner* — Peggy A Neils
(74) *Attorney, Agent, or Firm* — Volpe Koenig

(57) ABSTRACT

A heat sink is provided having at least one receiving section configured for thermal coupling to at least one lighting module. The heat sink includes at least two connection sections on opposite sides of the at least one receiving section. Each of the at least two connection sections includes at least one reference pin protruding at least partially from a first surface of the at least one connection section and at least one alignment recess protruding into the first surface of the at least one connection section such that the heat sink is configured for thermal coupling to another heat sink via the at least two connection sections.

19 Claims, 5 Drawing Sheets

(56) References Cited

U.S. PATENT DOCUMENTS

| | | | | |
|---|---|---|---|---|
| 10,267,475 | B2 | 4/2019 | Hermitte et al. | |
| 10,859,225 | B2 * | 12/2020 | Onoda | F21S 41/176 |
| 2009/0194253 | A1 | 8/2009 | Shen | |
| 2010/0182788 | A1 | 7/2010 | Luo et al. | |
| 2012/0314430 | A1 | 12/2012 | McCanless | |
| 2013/0027935 | A1 | 1/2013 | Ladewig et al. | |
| 2013/0043012 | A1 | 2/2013 | Chen | |
| 2013/0063937 | A1 | 3/2013 | Ahn et al. | |
| 2015/0124454 | A1 | 5/2015 | Honold | |
| 2015/0308652 | A1 * | 10/2015 | Cabanne | F21S 41/39<br>362/547 |

FOREIGN PATENT DOCUMENTS

| | | | |
|---|---|---|---|
| CN | 209991417 | U | 1/2020 |
| KR | 102020961 | B1 | 9/2019 |

OTHER PUBLICATIONS

International Search Report and Written Opinion mailed Sep. 2, 2021 for PCT International Application No. PCT/ US2021/032571.

Extended European Search Report dated Dec. 9, 2020 for European Patent Application No. 20180559.5.

International Preliminary Report on Patentability Chapter I issued Nov. 15, 2022 for PCT International Application No. PCT/US2021/032571.

Extended European Search Report dated Jun. 4, 2024 for European Patent Application No. 21803940.2.

* cited by examiner

DUAL FUNCTION LIGHTING DEVICE

CROSS REFERENCE TO RELATED APPLICATIONS

This application is a § 371 application of International Application No. PCT/US2021/032571, filed May 14, 2021, which claims the benefit of U.S. Provisional Application Ser. No. 63/024,891, filed on May 14, 2020, and European Application Serial No. EP 20180559.5, filed Jun. 17, 2020, the contents of which are hereby incorporated by reference herein.

BACKGROUND

Modern lighting devices used as automotive exterior or interior lights usually comprise a heat sink. A light emitting device or a lighting module (for example an LED) may be attached to the heat sink so that the heat from the operation of the lighting module can safely be transferred away from the heat sink without inflicting damage to the lighting module. The lighting module attached to the heat sink may be coupled to an electrical interface via electrical lines so that the lighting module can be externally controlled (e.g., switched between functions and/or turned on or off). In automotive lamps, such as headlamps or back lights, such heat sinks may have a form defined by the available space behind the optical element, such as a reflector or lens. For enabling multiple functions, such as a high beam and a low beam function, multiple units may be placed next to each other, while in other cases the units may be placed on top of each other.

SUMMARY

A heat sink is provided having at least one receiving section configured for thermal coupling to at least one lighting module. The heat sink includes at least two connection sections on opposite sides of the receiving section. Each of the connection sections includes at least one reference pin protruding at least partially from a first surface of the at least one connection section and at least one alignment recess protruding into the first surface of the at least one connection section such that the heat sink is configured for thermal coupling to another heat sink via the at least two connection sections.

BRIEF DESCRIPTION OF THE DRAWINGS

A more detailed understanding can be had from the following description, given by way of example in conjunction with the accompanying drawings wherein.

DETAILED DESCRIPTION OF THE PREFERRED EMBODIMENTS

Figure 1:
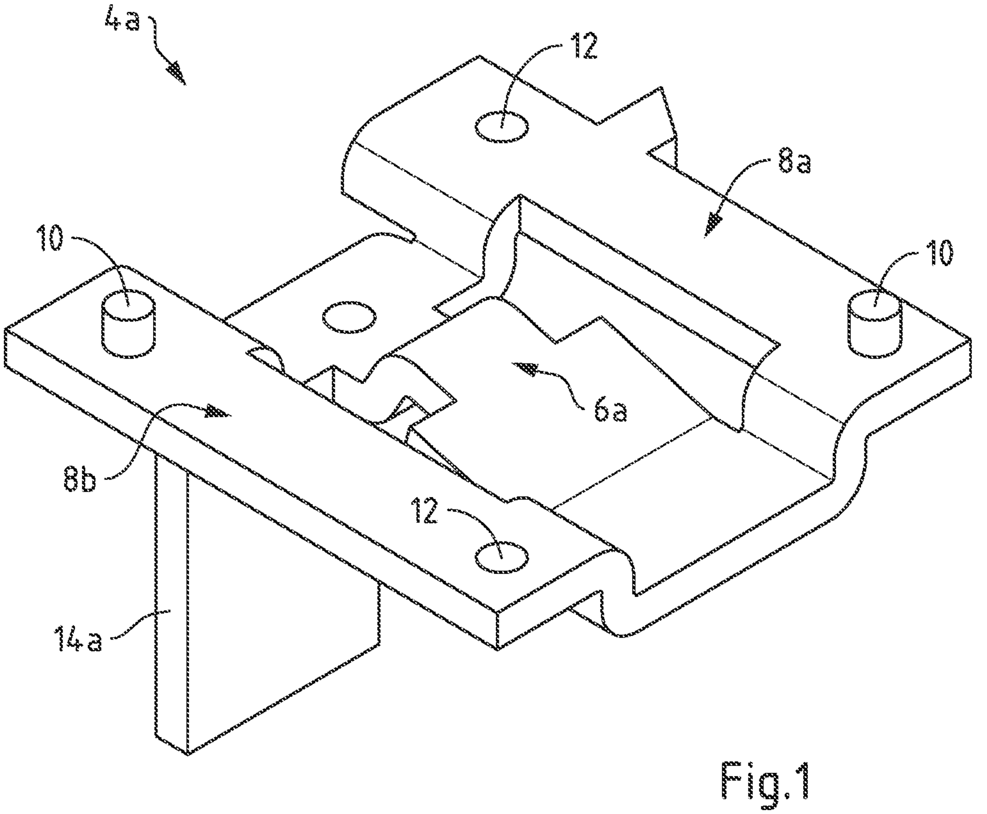
FIG. 1 is a top perspective view of an exemplary embodiment of a heat sink.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

In the embodiments described herein, heat sinks are provided that are arranged for mounting to one another. The heat sinks may have the same or similar shape. Each heat sink may have at least one receiving section for receiving at least one lighting module and may include at least one connection section for connecting to at least one connection section of the other heat sink. When the first heat sink is connected to the other heat sink, the connection sections of the heat sinks may be in thermal contact with one another. The connection sections of the heat sinks may include at least one reference pin and at least one alignment recess. The shape and position of the alignment recess on the first heat sink may correspond to the shape and position of the reference pin on the other heat sink. This may enable alignment and coupling of the heat sinks to one another to ensure accurate positioning of the lighting modules thereon.

The heat sinks described herein may be comparatively simple in construction and lower in cost because they may avoid the need for a complex die-cast freeform or the need for multiple extruded or stamped structures welded together, which involve complex manufacturing and are higher in cost. Additionally, the heat sinks described herein may ensure that lighting modules may be accurately positioned on the heat sinks to ensure that emitted light conforms with requirements of lighting standards and specifications.

FIG. 1 shows a heat sink 4*a* for a lighting device 2 (see, FIG. 2*c*) in a perspective view. In the example illustrated in FIG. 1, the heat sink 4*a* comprises a receiving section 6*a* for receiving a lighting module 18*b* (see FIG. 2*c*) and two connection sections 8*a* and 8*b*. The connection sections 8*a* and 8*b* may each be coupled to the receiving section 6*a*, wherein both ends of the receiving section 6*a* may be respectively coupled to the respective connection sections 8*a* and 8*b*. Between the receiving section 6*a* and the respective connection sections 8*a* and 8*b*, there may be a cut-out portion 16 (see, FIG. 2*a*) at which the receiving section 6*a* may not comprise a connection or may not be coupled to the respective connection sections 8*a* and 8*b*. As shown in FIG. 2*b*, each of the connection sections 8*a* and 8*b* may comprise one reference pin 10 and one alignment recess 12. The respective reference pins 10 may protrude from the shown surface of the connection sections 8*a* and 8*b*. The heat sink 4*a* may comprise a vertical section 14*a*, which may extend in an opposite direction of the reference pins 10. The vertical section 14*a* may be coupled to the receiving section 6*a*, too, at a respective end of the receiving section 6*a*.

The receiving section 6*a* may be tilted in relation to the respective connection sections 8*a* and 8*b* so that a lighting module to be mounted to the receiving section 6*a* may therefore be titled as well.

Figure 2A:
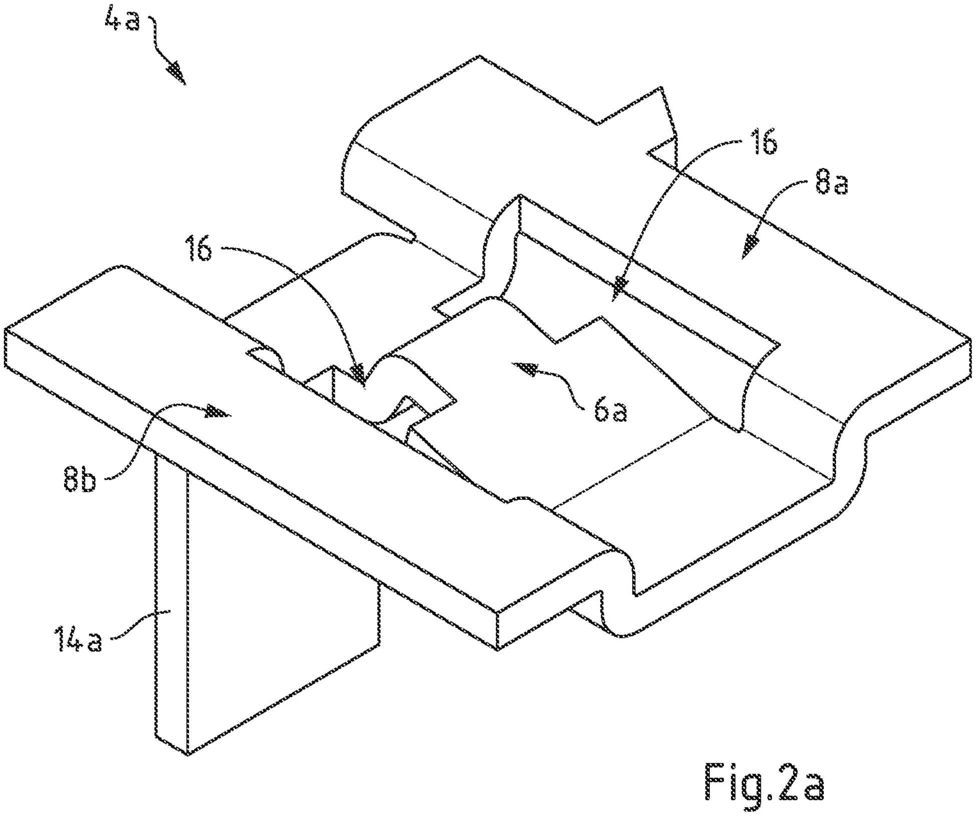
FIG. 2*a* illustrates a step in a manufacturing process wherein a first heat sink is formed.
Figure 2B:
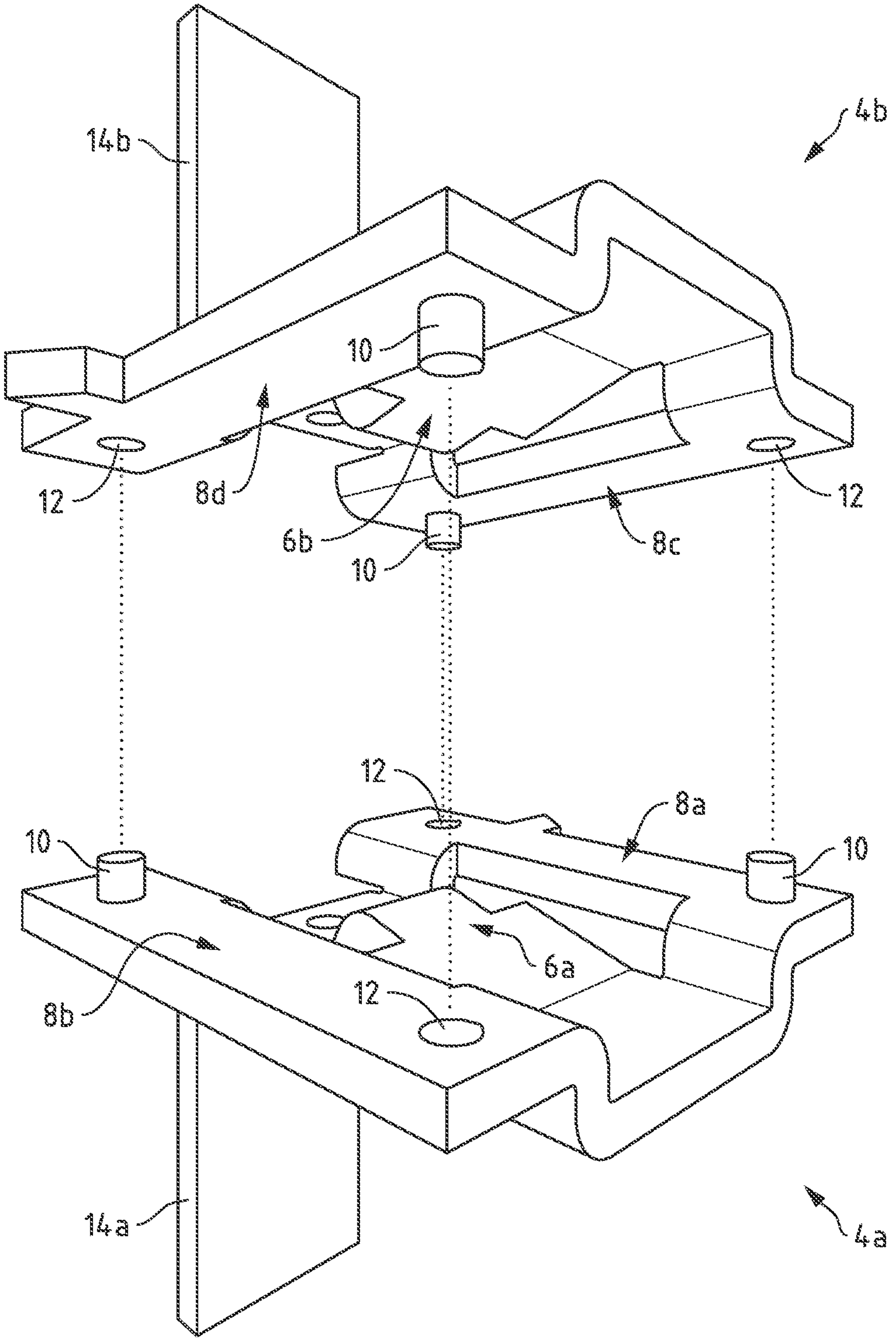
FIG. 2*b* illustrates a step in the manufacturing process wherein reference pins and recesses of the first heat sink align for engagement with pins and recesses of an exemplary embodiment of a second heat sink.
Figure 2C:
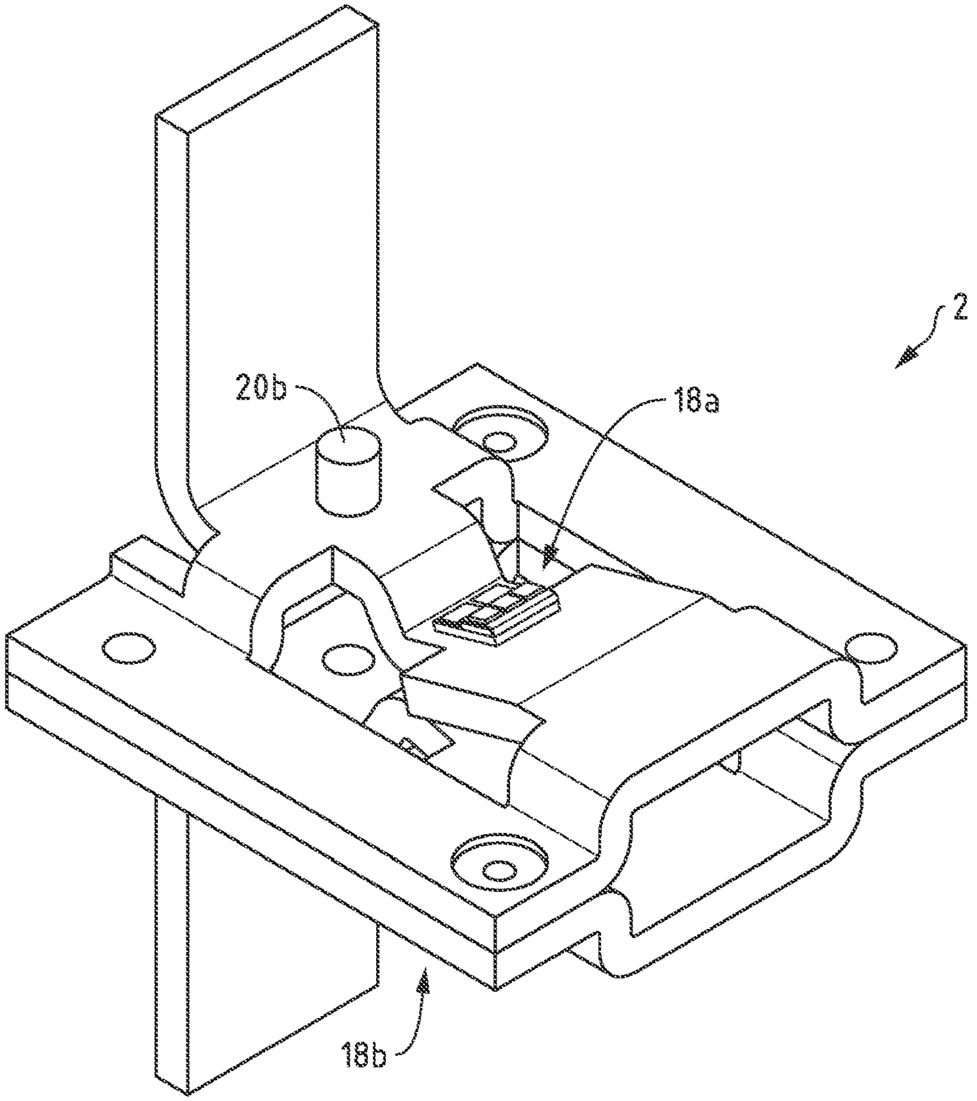
FIG. 2*c* illustrates a step in the manufacturing process wherein the exemplary embodiments of the first and second heat sinks are joined together.
Figure 2D:
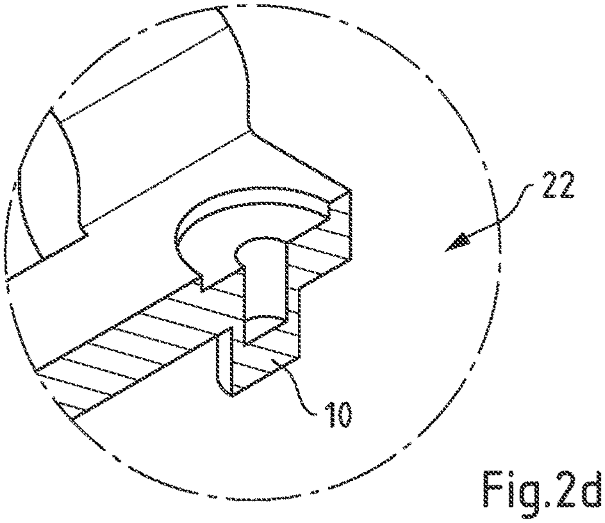
FIG. 2*d* shows a detailed view of a riveting connection between the exemplary embodiments of the first and second heat sinks.

The shape of the heat sink 4*a* may allow for the heat sink 4*a* to be coupled to a similar or identical heat sink (see FIGS. 2*a-c*). Alternatively, in case a match is given between coupling interfaces of the heat sink 4*a* and another element, the heat sink 4*a* may be coupled to such an element as well. In this way, for example, as an application, an LED module design, such as according to MACH 3 specification, may be enabled. Such an LED module may provide, for example, a low beam and a high beam lighting source that may be combined to be mounted to one reflector, such as of an automotive head lamp.

The at least one receiving section may be configured for receiving the at least one lighting module and may be formed in the heat sink. The receiving section may for instance be an opening or a protrusion in the heat sink in or on which a lighting module can be placed. The at least one receiving section may be a pedestal or a cavity. For instance, the at least one lighting module can be arranged or mounted to the heat sink in the receiving section. This can insure that the at least one lighting module is accurately positioned on the heat sink. At least one light emitting device may be coupled with the heat sink, for example thermally.

The lighting module may for instance be a light emitting device such as a single LED die, or it may be or comprise an LED unit, as described above. An LED unit may comprise two or three or more LED dies. Such an LED unit may for instance be arranged or mounted directly to the receiving section of the heat sink. The lighting module may be configured to emit light towards a light-emitting side. The light-emitting side may represent one or more areas of or around the heat sink, wherein an object that is to be illuminated may be brought to the light-emitting side for illumination. The lighting device may be intended for use in a lighting application requiring intense bright light, such as an automotive head or back light. Heat may be transferred from the at least one lighting module to a heat sink by means of a thermal connection between them. For instance, the lighting module may be mounted, for example, by soldering and/or gluing, on the heat sink using a thermally conductive material such as a thermal paste, thermal glue or thermal pad. For enabling two heat sinks to transfer the heat together, according to another exemplary embodiment, the at least two heat sinks may be thermally coupled to each other.

The heat sink is intended to be mounted to another heat sink that is identical to the heat sink or is at least similar to the heat sink in such a way that it provides features that allow the two heat sinks to be accurately connected to each other.

The connection section of the heat sink may enable a coupling of the heat sink to such at least one connection section of the other heat sink. For example, a thermal connection may be established via the respective connection sections of the heat sink and the other heat sink when the two heat sinks are connected, coupled or otherwise joined. For enabling such an accurate connection between two identical or at least similar heat sinks, both may comprise at least one reference pin protruding at least partially from the at least one connection section and further may respectively comprise at least one alignment recess, wherein a shape and a position of the at least one alignment recess may correspond to a shape and a position of the reference pin of the other heat sink, and vice versa. In this way, it may be enabled to align the heat sink to the other heat sink. Thereby, for example, a form-fit connection may be established by a respective reference pin engaging into a respective alignment recess when the heat sink is connected to the other heat sink.

The other heat sink may comprise a respective alignment recess at a corresponding position in relation to the reference pin of the heat sink so that when the two heat sinks are joined respectively and connected, a form-fit connection between the reference pin and the alignment recess may be established. Further, the connection sections of the two heat sinks should match so that a thermal connection between them may be enabled to transfer the heat produced by lighting modules away.

By, for example, using two connected respectively joined identical or at least similar parts of the heat sink, a more cost-effective solution for the heat sink may be enabled. Accurately aligning two separate sheet metal parts may be needed to meet the alignment specification for a source. Thus, the heat sink may be needed to be connected with an accuracy of at least 100 μm or less to provide sufficient alignment, meaning that a lighting module mounted to a heat sink, which is mounted to an optical element (e.g., a reflector), may be accurately positioned so that the light is emitted as needed by the specification.

The heat sink may comprise, for example, an LED placement area, reference and/or alignment features in the form of the alignment pin(s) for the related optic(s) and/or optical element(s) as well as deep drawn reference pin(s) and alignment recess(s). The two latter ones may be used, for example, to attach another similar heat sink by its connection features (reference pin(s) and alignment recess(s)) and/or to a heat sink comprising at least identical connection features enabling to connect such heat sinks. Alternatively, the two latter ones can be used, for example, to attach another heat sink being different in its shape, which may comprise the same kind of connection features enabling a connection to the heat sink. Thus, no additional components may be needed by the lighting device in case two identical heat sinks are to be connected and respectively combined. In particular, the two heat sinks to be connected may comprise one receiving section and two connection sections, wherein one of the two connection sections may comprise a respective reference pin, and the other connection section of the two connection sections of the heat sink may comprise a respective alignment recess formed to match the outer shape of the respective reference pin. This may allow (i) two of such heat sinks to be connected and (ii) accurate alignment to be achieved when two of such heat sinks are connected. The reference pin(s) may be for the alignment of the two heat sinks and not for an alignment of the heat sink(s) to such an optical element (e.g., a reflector). Such an alignment of the heat sink(s) to an optical element may for instance be enabled by an alignment pin that may be comprised by at least one of the two heat sinks to be connected to each other.

The at least one reference pin may protrude (e.g., stick out) from the at least one connection section by about 1 mm to 5 mm, to name a non-limiting example. Such a length of protrusion by the at least one reference pin may be sufficient to enable accurate alignment. The at least one connection section, or at least two connection sections in case a respective heat sink comprises more than one (e.g., at least two) of such connection sections, may comprise one or more reference pins and/or one or more alignment recesses. Thus, it may be possible to have a plurality of reference pins and/or corresponding alignment recesses, but it may not affect the function of a respective reference pin and/or alignment recess in detail.

According to another exemplary embodiment, the heat sink may be formed from sheet metal. The heat sink may be made by a forming, stamping, punching, and/or trimming process from a thermally conductive material, for example from a metallic material, such as a sheet metal. In particular, the reference pin(s) and/or the alignment recess(es) may be made by extruding or deep drawing them into the heat sink, for example in the same or a subsequent manufacturing process following the forming, stamping, punching, and/or trimming process. By extruding or deep drawing the reference pin(s) and/or the alignment recess(es), a very high accuracy of the positioning of the reference pin(s) and/or the alignment recess(es) can be assured. In some embodiments, the heat sink may comprise or consists of aluminum, copper, or aluminum and/or copper-based alloys. The thickness of the sheet metal may be determined based upon the amount of heat to be transferred, for example, the sheet metal having a thickness of about 0.5 mm to 10 mm.

According to another exemplary embodiment, the at least one reference pin of the heat sink may engage with at least one alignment recess of the other heat sink when the heat sink is connected to the other heat sink. Also, the at least one reference pin of the other heat sink may, for example simultaneously, engage with at least one alignment recess of the heat sink when the heat sink is connected to the other heat sink.

According to another exemplary embodiment, the at least one receiving section for the at least one lighting module may be angled (e.g., tilted) in relation to the at least one connection section. The receiving section may be angled or tilted in relation to the connection section(s) of the heat sink. Thus, a lighting module to be mounted to the receiving section may be angled in such a way that light is emitted in a direction as specified by the angle between the plane as defined by the connection section(s) and the receiving section. In case the heat sink comprises more than one connection section, for example at least two connection sections, the at least two connection sections may lie in the same plane. The amount that the receiving section is tilted or angled in relation to the connection section may be between 5° and 50°, to name a non-limiting example. Such an angle may enhance the emitting of light from a lighting module when it is mounted to the heat sink.

According to another exemplary embodiment, the heat sink may further comprise at least one cut-out portion between the at least one receiving section and the at least one connection portion, wherein the at least one receiving section may be connected, at least in part, to the at least one connection section by at least one of its ends. The receiving section may be connected to one connection section via at least one mechanical coupling, For example, a certain part of the heat sink (respectively the sheet metal) may connect the receiving section or a part of it to the connection section(s). There may be a cut-out portion located between the receiving section and the connection section(s) at which the receiving section may not be connected with the connection section(s). Such a cut-out portion may enhance the manufacturing of heat sinks since they can be trimmed into its form and may enable enough material so that the receiving section can be respectively tilted in relation to the connection section(s) of the heat sink.

According to another exemplary embodiment, the at least one receiving section may be elevated in relation to the at least one connection section. Thus, the receiving section may be arranged in such a way that a gravity center point of the receiving section is above a respective gravity center point of the at least one connection section. This may allow for adapting the heat sink and the location of a lighting module to be mounted to the receiving section to fulfill certain requirements, for example as set out by lighting specifications for automotive lighting applications, to name but one non-limiting example.

According to another exemplary embodiment, the heat sink may further comprise at least one vertical section connecting to the at least one receiving section so that an L-shape is formed. Such a vertical section may be needed so that a lighting device made by at least two heat sinks can mimic in its dimension a specific head lamp pendant. Further, the vertical section may be used to mount the lighting device in an automotive lighting appliance in a certain aligned position in relation to an optical element. Further, the vertical section may provide the option to fix the lighting device to another device. Sticking out on both sides, when two heat sinks are connected to each other, may enable defining a balancing point to counter a tilting of the receiving sections of the heat sinks. It will be understood that the at least one vertical section connecting to the at least one receiving section may form a shape that is different from the L-shape, such as a T-shape, to name but one non-limiting example. Such a T-shape may be established, for example, in case the vertical section is connected to another receiving section. For instance, any shape that can enlarge the established effective cooling area within the reflector boundaries may be suitable.

According to another exemplary embodiment, the heat sink may further comprise at least one alignment pin protruding in the same direction as the at least one vertical section enabling alignment to at least one optical element. The alignment of the lighting device may be enabled when the heat sink and the other heat sink are connected to each other.

There may be a need for an accurate system to position the lighting device (e.g., a lamp) in a reflector, such as an automotive head lamp. The alignment pin may for instance provide a locating surface so that, for example, an optical element can be mounted in a pre-defined and/or aligned position, in relation to the lighting device. The optical element may be a reflector or a lens, to name but a few non-limiting examples. The optical element may further be mounted and/or fixed to the heat sink or the lighting device comprising, for example, two heat sinks.

For the assembly of a dual function LED module (e.g., for head lighting application in automotive appliances), two similar and/or identical heat sinks (e.g., sheet metal parts) may be used, wherein the two heat sinks may be connected (e.g., joined), such as to host the lighting modules (e.g., LEDs) for two functions (e.g., low beam and high beam).

According to another exemplary embodiment, the at least two heat sinks may be thermally connected to each other. By connecting the heat sink and the other heat sink, for example, one (single) assembly, the at least one connection section of a first heat sink may be in thermal contact to such corresponding connection section of a second, other heat sink. In this way, thermal energy or heat produced by the operation of one or more lighting modules of one heat sink may be transferred to the other heat sink, and vice versa. The two heat sinks may be connected by riveting the two heat sinks together.

According to another exemplary embodiment, the at least one reference pin and/or the at least one alignment recess may be deep drawn in one (e.g., a single) direction. Deep drawing in a single direction can be done during manufacturing in a more efficient matter in contrast to deep drawing in several directions. Also, deep drawing in a single direction may enable to deep draw a plurality (e.g., at least two) reference pins and/or alignment recesses simultaneously, such as in a single manufacturing step.

According to another exemplary embodiment, the at least two lighting modules may emit light in at least two different directions. By emitting light in at least two different directions, the lighting device may be used for dual function LED modules for automotive appliances, such as to combine low beam and high beam functions within one lighting device. For instance, the heat sink representing a top part of the lighting device may host the high beam function. Further, the heat sink representing a bottom part may host the low beam function. Both heat sinks, the top heat sink and the bottom heat sink, may use an identical sheet metal part. In the alternative, the lighting device may also be used for a single function lighting application, for example if two opposing light beam directions are needed for the same function, to name but one non-limiting example.

According to another exemplary embodiment, the at least two heat sinks may be coupled or connected (e.g., fixed) to each other by riveting them together. One or more rivets may be used to connect the two heat sinks for manufacturing the lighting device.

According to another exemplary embodiment, the at least two heat sinks may be riveted together via their respective reference pins and their respective alignment recesses. For instance, the reference pin(s) of a heat sink may be inserted into the alignment recess(s) of another heat sink, and vice versa. Thus, the reference pins may be used as rivet pins. Then, to form the mechanical fastening of the riveting connection, a part of the reference pin(s) extending out of the alignment recess(s) after the insertion(s) may be upset or bucked (e.g., deformed) to form at least a friction lock connection between them. Thus, it may be enabled to, for example, directly form a rivet pin into the sheet metal by forming the respective heat sink(s). Further, two heat sinks may be fixed together via such a riveting.

Each heat sink of the at least two heat sinks may comprise at least one lighting module that is arranged on or to the respective receiving section of the respective heat sink. The two heat sinks are thermally connected to each other via their respective connection sections, for example, in case heat can be transferred from one heat sink to the other, and vice versa, at least via the connection sections. The respective heat sinks may be connected to each other by utilizing the respective reference pins and alignment recesses that are connected by form-fit to establish a riveting connection.

FIGS. 2*a*-*c* show an exemplary embodiment illustrating the steps for manufacturing a lighting device. These manufacturing steps may also be shown in the flow diagram of FIG. 3 at steps 510, 520, 530, 540, 550, and 560. In order to achieve a certain amount of material comprised by the lighting device 2 (see FIG. 2*c*) for heat transfer, two heat sinks corresponding to the example embodiment of a heat sink 4*a* shown in FIG. 1 can be respectively combined.

Figure 3:
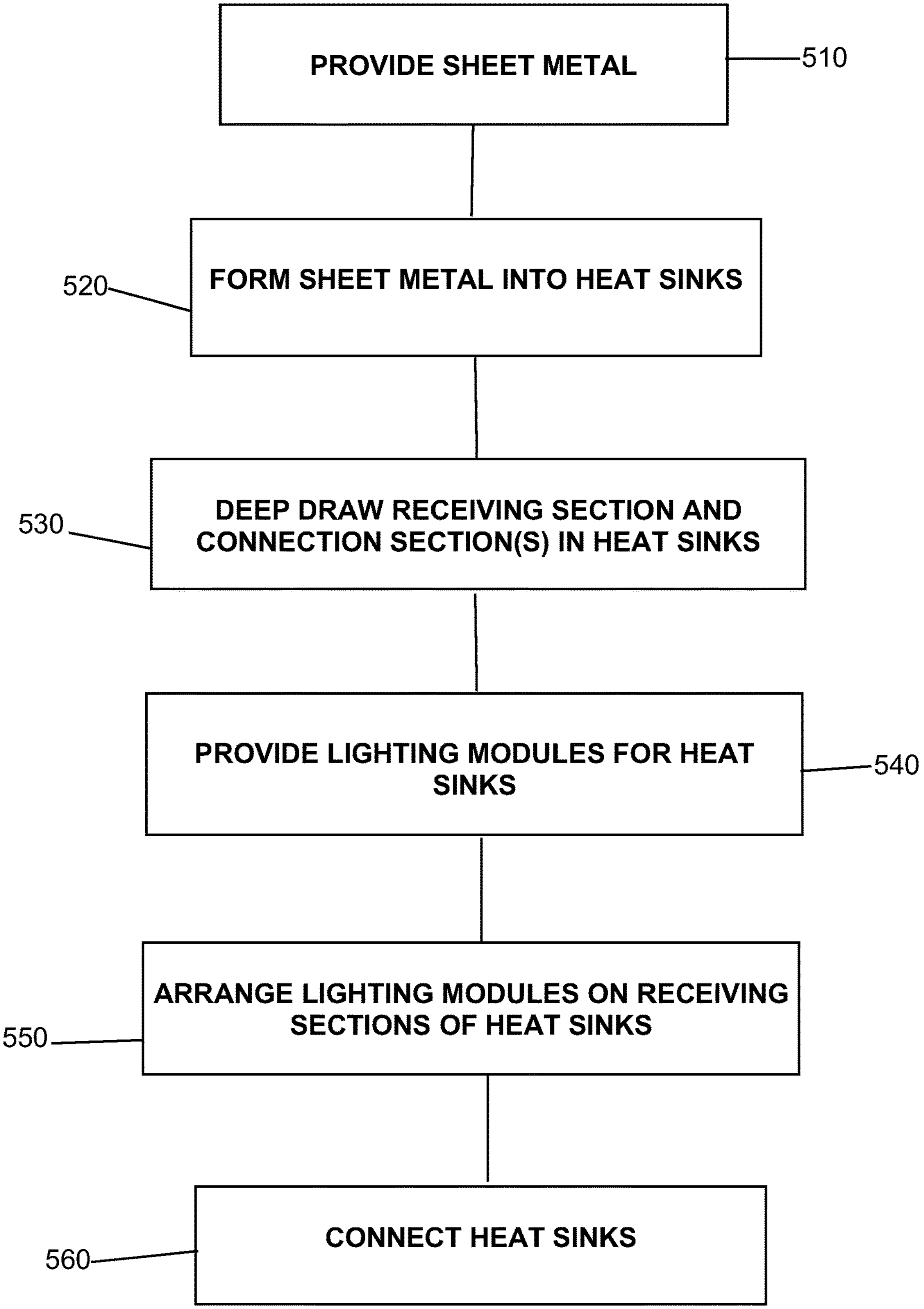
FIG. 3 is a flow diagram illustrating the steps in the manufacture of a light device including the first and second heat sinks.

In a first manufacturing step shown in FIG. 2*a* and in FIG. 3 at 510, a sheet metal may be provided. At FIG. 3 at 520, the sheet metal may be formed into a first heat sink 4*a*. This sheet metal, or another sheet metal, may be formed into another or a second heat sink, for example having the same or similar shape as the first heat sink (not shown in FIG. 2*a*). The two heat sinks may be formed, for example, by trimming the sheet metal(s) into the shape of the heat sinks. Alternatively, the heat sinks may be formed, for example by laser-cutting, to name but one further and non-limiting example.

Each of the two formed heat sinks may comprise a receiving section 6*a* for the shown heat sink 4*a* for one or more lighting modules. Further, each of the two formed heat sinks may comprise a connection section, for example for connecting the connection sections 8*a*, 8*b* of the first heat sink 4*a* to such connection sections 8*c* and 8*d* (see FIG. 2*b*) of the second heat sink 4*b*. The connection sections 8*a* and 8*b* may be in thermal contact with the corresponding connection sections 8*c* and 8*d* of the second heat sink 4*b* when the first heat sink 4*a* is connected to the second heat sink 4*b* (see FIGS. 2*c* and 3).

In FIG. 3 at 530 (also shown in FIG. 2*b*), the reference pins 10 and the alignment recesses 12 may be extruded into the respective connection sections 8*a* and 8*b* of the first heat sink 4*a* and into the respective connection sections 8*c* and 8*d* of the second heat sink 4*b*. Alternatively, the reference pins 10 and the alignment recesses 12 may also be deep drawn.

Referring now to FIG. 3, at 560, and in the dotted lines in FIG. 2*b*, the two heat sinks 4*a* and 4*b* can be connected with each other, wherein the respective reference pins 10 of the first heat sink 4*a* engage with the respective alignment recesses 12 of the second heat sink 4*b*. Further, the respective reference pins 10 of the second heat sink 4*b* may engage with the respective alignment recesses 12 of the first heat sink 4*a* in the same manner.

As shown in FIGS. 3, at 540 and 550, prior to establishing the connection between the first and the second heat sink 4*a* and 4*b*, one or more lighting modules (e.g., LEDs) may be provided (540) and arranged on the respective receiving sections 6*a* and 6*b* of the first and second heat sinks 4*a* and 4*b* 550). This may have the advantage that, for example, the placement of the respective lighting modules 18*a* and 18*b* may be enhanced.

As shown in FIG. 3 at 560 (also shown in FIG. 2*c*, the two heat sinks 4*a* and 4*b* representing two parts of the lighting device 2 may be respectively joined, such as by establishing a rivet connection. For riveting the first and the second heat sink 4_a_ and 4_b_ together, the deep drawn reference pins 10 and the alignment recesses 12 as comprised by the respective connection sections 8_a_, 8_b_, 8_c_ and 8_d_ may be utilized, as described above.

A detailed view of such a riveting connection established by utilizing a respective reference pin 10 and a respective alignment recess 12 is shown in FIG. 2_d_.

Example embodiments enable a very accurate aligning of the two heat sinks represented by or made out of metal parts. In particular, a heat sink intended to be connected to another similar or same heat sink may fulfills a number of functions, such as enabling riveting and allowing for very accurate alignment of the two heat sinks when they are joined, for example by utilizing the deep drawn reference pins and/or alignment recesses comprised by the heat sinks.

To ensure such an accurate alignment, the relation between the position of one or more lighting modules of a respective lighting device may be achieved, for example, by the respective heat sinks, which may optionally comprise one or more alignment pins that can be put against an optical element, such as a reflector of an automotive lamp, such as a headlamp. Since the deep drawing of the reference pin(s) and/or the alignment recess(es), and optionally of the alignment pin(s), may enable the respective elements to be deep drawn with high accuracy, it can be ensured that light emitted by the respective lighting module(s) is emitted as needed, such as by a certain standard/lighting specification.

To further enable accurate mounting of a respective lighting device, for example, in an automotive lamp, such as a headlamp, at least one of the heat sinks of the lighting device may comprise a protruding element, for example so that the lighting device can stop in a certain position of a mounting of the automotive lamp. For instance, a first protruding element may extend on a left side of the heat sink so that when two corresponding (thus, similar or identical) heat sinks are connected, a first of such protruding elements may stick out on the left side of the lighting device and a second of such protruding elements may stick out on the right side of the lighting device.

For manufacturing of the lighting device, for example by a pick-and-place robot utilizing a placement head for mounting the at least one lighting module to the heat sink, the at least one lighting module may be provided for the heat sink. Then, the at least one lighting module may be arranged on the heat sink. These steps may be repeated in sequence or in parallel for the other heat sink as well. Since the heat sink and the other heat sink are not yet connected to each other, the placement head may have easy access to the respective receiving sections for arranging the at least one lighting module. After the lighting modules are separately mounted to the heat sink and the other heat sink, for example as described above, the heat sink and the other heat sink may be joined by establishing a thermal connection between the heat sink and the other heat sink.

A combined manufacturing of all alignment elements with other alignment features, the reference pin(s) may further comprise one or more fiducials, to name but one non-limiting example, such as for LED placement. All relevant referencing and joining features to connect two heat sinks to form a lighting device may be made in one trimming/cutting/forming step. This may enable an accuracy advantage over other connection technologies like gluing, welding and/or screwing. In this way, there may be no need for separate joining parts so that the solution as provided by the example embodiments may be more cost effective.

It is to be understood that the presentation of embodiments set forth above is merely exemplary and non-limiting.

Other features will become apparent from this detailed description considered in conjunction with the accompanying drawings. It is to be understood, however, that the drawings are designed solely for purposes of illustration and are not limiting. It should be further understood that the drawings are not drawn to scale and that they are merely intended to conceptually illustrate the structures and procedures described herein.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A heat sink comprising:
- at least one receiving section configured for thermal coupling to at least one lighting module; and
- at least two connection sections on opposite sides of the at least one receiving section, each of the at least two connection sections comprising at least one reference pin protruding at least partially from a first surface of each of the two connection sections and at least one alignment recess protruding into the first surface of each of the two connection sections such that the heat sink is configured for thermal coupling to another identical heat sink via the at least two connection sections,
- the at least one receiving section being elevated in relation to the at least two connection sections.

2. The heat sink of claim 1, wherein the at least one alignment recess and the at least one reference pin have the same shape.

3. The heat sink of claim 1, wherein the heat sink is formed from sheet metal.

4. The heat sink of claim 1, wherein the at least one receiving section is angled in relation to the at least two connection sections at an angle of 5° to 50°.

5. The heat sink of claim 1, wherein the at least one receiving section is thermally coupled to the at least two connection sections, and the heat sink further comprises at least one cut-out portion between the at least one receiving section and each of the at least two connection sections.

6. The heat sink of claim 1, further comprising:
- at least one vertical section thermally coupled to the at least one receiving section so that an L-shape is formed by the at least one vertical section and the at least one receiving section.

7. The heat sink of claim 6, further comprising:
- at least one alignment pin protruding in the same direction as the at least one vertical section and configured for alignment to at least one optical element.

8. The heat sink of claim 1, wherein the at least one reference pin and the at least one alignment recess are deep drawn in one direction.

9. A lighting device comprising:
- at least two heat sinks, each of the at least two heat sinks comprising:
  - at least one receiving section, and
  - at least one connection section comprising at least one reference pin protruding at least partially from a first surface of the at least one connection section and at least one alignment recess protruding into the first surface of the at least one connection section, the at least two heat sinks being arranged with a first surface of a first one of the at least two heat sinks in contact with a first surface of a second one of the at least two heat sinks and with the at least one reference pin of each of the at least two heat sinks disposed in the at least one alignment recess of the other one of the at least two heat sinks; and at least two lighting modules, each of the at least two lighting modules being mounted to a respective one of the at least one receiving section of the at least two heat sinks.

10. The light device of claim 9, wherein the at least one receiving section of each of the at least two heat sinks are angled relative to the at least one connection section at an angle of 5° to 50°.

11. The lighting device of claim 10, wherein the at least one receiving section of each of the at least two heat sinks are angled in different directions such that the at least two lighting modules mounted to each of the at least one receiving section emit light in at least two different directions.

12. The lighting device of claim 9, wherein the at least two heat sinks are riveted together.

13. The lighting device of claim 12, wherein the at least two heat sinks are riveted together via their respective reference pins and their respective alignment recesses.

14. The lighting device of claim 9, wherein the at least one alignment recess and the at least one reference pin have the same shape.

15. The lighting device of claim 9, wherein the at least one receiving section of each of the at least two heat sinks is elevated in relation to the at least one connection section of each of the at least two heat sinks such that the at least one connection section of each of the at least two heat sinks are in contact with each other and the at least one receiving section of each of the at least two heat sinks are not in contact with each other.

16. The lighting device of claim 9, wherein each of the at least two heat sinks comprises two connection sections and one receiving section with each of the two connection sections on opposite sides of the one receiving section, and each of the two connection sections being in contact with a respective one of the two connection sections of the other one of the at least two heat sinks.

17. The lighting device of claim 9, wherein the lighting device is one of an automobile headlamp or an automobile rear light.

18. A method of manufacturing a light device, the method comprising:

providing at least one sheet metal;

forming the at least one sheet metal into at least two heat sinks;

deep drawing at least one receiving section and at least one connection section in one direction for each heat sink of the at least two heat sinks, the at least one connection section comprising at least one reference pin protruding at least partially from a first surface of the at least one connection section and at least one alignment recess protruding into the first surface of the at least one connection section;

providing at least one lighting module for each respective heat sink of the at least two heat sinks;

arranging the respective lighting modules in each respective receiving section of the at least two heat sinks; and connecting the at least two heat sinks.

19. The method of claim 18, wherein the connecting the at least two heat sinks comprises riveting the at least two heat sinks together via their respective reference pins and their respective alignment recesses.

* * * * *